US006981748B2

(12) United States Patent
Garnweidner et al.

(10) Patent No.: US 6,981,748 B2
(45) Date of Patent: Jan. 3, 2006

(54) REAR SEAT BACK FOR A VEHICLE BACK SEAT

(75) Inventors: Peter Garnweidner, Lamprechtshausen (AT); Christian Danninger, Strasswalchen (AT)

(73) Assignee: Euromotive GmbH & Co. KG, Ranshofen (AT)

( * ) Notice: Subject to any disclaimer, the term of this patent is extended or adjusted under 35 U.S.C. 154(b) by 0 days.

(21) Appl. No.: 10/757,461

(22) Filed: Jan. 15, 2004

(65) Prior Publication Data

US 2004/0155511 A1 Aug. 12, 2004

(30) Foreign Application Priority Data

Jan. 15, 2003 (DE) ................................. 103 01 283

(51) Int. Cl.
*B60N 2/64* (2006.01)

(52) U.S. Cl. ............................ 297/452.18; 297/218.1

(58) Field of Classification Search ............ 297/218.1, 297/218.2, 218.4, 218.5, 452.18, 452.2
See application file for complete search history.

(56) References Cited

U.S. PATENT DOCUMENTS

| | | | | |
|---|---|---|---|---|
| 3,506,987 A | * | 4/1970 | Bielak ..................... | 297/218.1 |
| 3,981,534 A | * | 9/1976 | Wilton ..................... | 297/218.1 |
| 4,805,962 A | * | 2/1989 | Sacco et al. ........... | 297/452.14 |
| 4,834,451 A | * | 5/1989 | Meunier et al. ......... | 297/218.2 |
| 5,295,732 A | | 3/1994 | Boisset | |
| 5,412,860 A | | 5/1995 | Miyauchi et al. | |
| 5,478,134 A | * | 12/1995 | Bernard et al. .......... | 297/218.1 |
| 5,503,454 A | * | 4/1996 | Sakamoto ................ | 297/218.1 |
| 5,601,333 A | * | 2/1997 | Bostrom et al. ......... | 297/218.5 |
| 5,718,478 A | * | 2/1998 | Allison .................... | 297/344.1 |
| 5,954,395 A | * | 9/1999 | Moulins et al. .......... | 297/218.4 |
| 6,027,171 A | | 2/2000 | Partington et al. | |
| 6,352,311 B1 | | 3/2002 | Hayotte | |
| 6,375,268 B2 | * | 4/2002 | Okazaki et al. ........ | 297/452.18 |
| 6,406,093 B1 | * | 6/2002 | Miotto et al. ........... | 297/218.5 |
| 6,742,847 B2 | * | 6/2004 | Yanai ...................... | 297/452.2 |

FOREIGN PATENT DOCUMENTS

| | | |
|---|---|---|
| DE | 298 16 819 U1 | 1/1999 |
| EP | 0 689 957 A1 | 1/1996 |
| EP | 0 989 019 A2 | 3/2000 |
| FR | 2 786 447 A1 | 6/2000 |
| GB | 457229 | 11/1936 |
| WO | WO 01/89875 A1 | 11/2001 |

\* cited by examiner

*Primary Examiner*—Peter R. Brown
(74) *Attorney, Agent, or Firm*—Nixon Peabody LLP; David S. Safran

(57) ABSTRACT

A rear seat back for a vehicle back seat having a support frame, a rear wall (2) attached to the support frame and a covering channel (7) for anchoring the seat covering (5). The support frame is formed of extruded profile sections and is constructed in one piece with the covering channel (7), and the rear wall (4) is formed of a substantially flat component.

8 Claims, 4 Drawing Sheets

REAR SEAT BACK FOR A VEHICLE BACK SEAT

BACKGROUND OF THE INVENTION

1. Field of the Invention

The invention relates to a rear seat back for a vehicle back seat comprising a support frame, a rear wall attached thereto and a covering channel for anchoring the seat covering.

2. Description of Related Art

Conventional rear seat backs for a vehicle back seat are frequently constructed with a ⅔-⅓ or 60-40% division with a ski bag and shoulder seat-belt point for the middle seat position in the seat back. The seat back is either foldable and held at the top with a lock at the C pillar, where the lower bearing points are pivot points or it is constructed to be pivotable and foldable with seat back inclination adjusters in the hip region.

The support frame is usually made of a steel tubular frame and the rear wall is made of steel sheet.

In addition to the high weight as a result of using steel as material for the support frame, the structure of such a rear seat back also has the disadvantage that, for every new vehicle, the complete tools for manufacturing the support frame and the rear wall must be newly prepared. This is associated with high costs, which particularly applies to the large deep drawing tool for the rear wall since, in the conventional rear seat back construction, the covering channel is located in the sheet metal section of the rear wall.

SUMMARY OF THE INVENTION

A primary object of the invention is, thus, to provide a rear seat back of the type specified initially which can be adapted simply and cheaply to different vehicle models, and in this case, does not bring about any or only small additional tool costs.

This object is achieved according to the invention by the fact that the support frame is made of extruded profile sections which are formed in one piece with the covering channel and the rear wall is formed of a substantially flat component.

Since the covering channel is integrated in the support frame in the rear seat back according to the invention, the rear wall can be made of a single flat sheet section with crimping. Since laser devices are used increasingly frequently in the production of sheet plates, a change in the geometry of the width or the height can be achieved without any tool expenditure. The crimping is always accomplished using the same tool.

Preferred embodiments of the invention are explained in detail below with reference to the accompanying drawings.

DETAILED DESCRIPTION OF THE INVENTION

Figure 1:
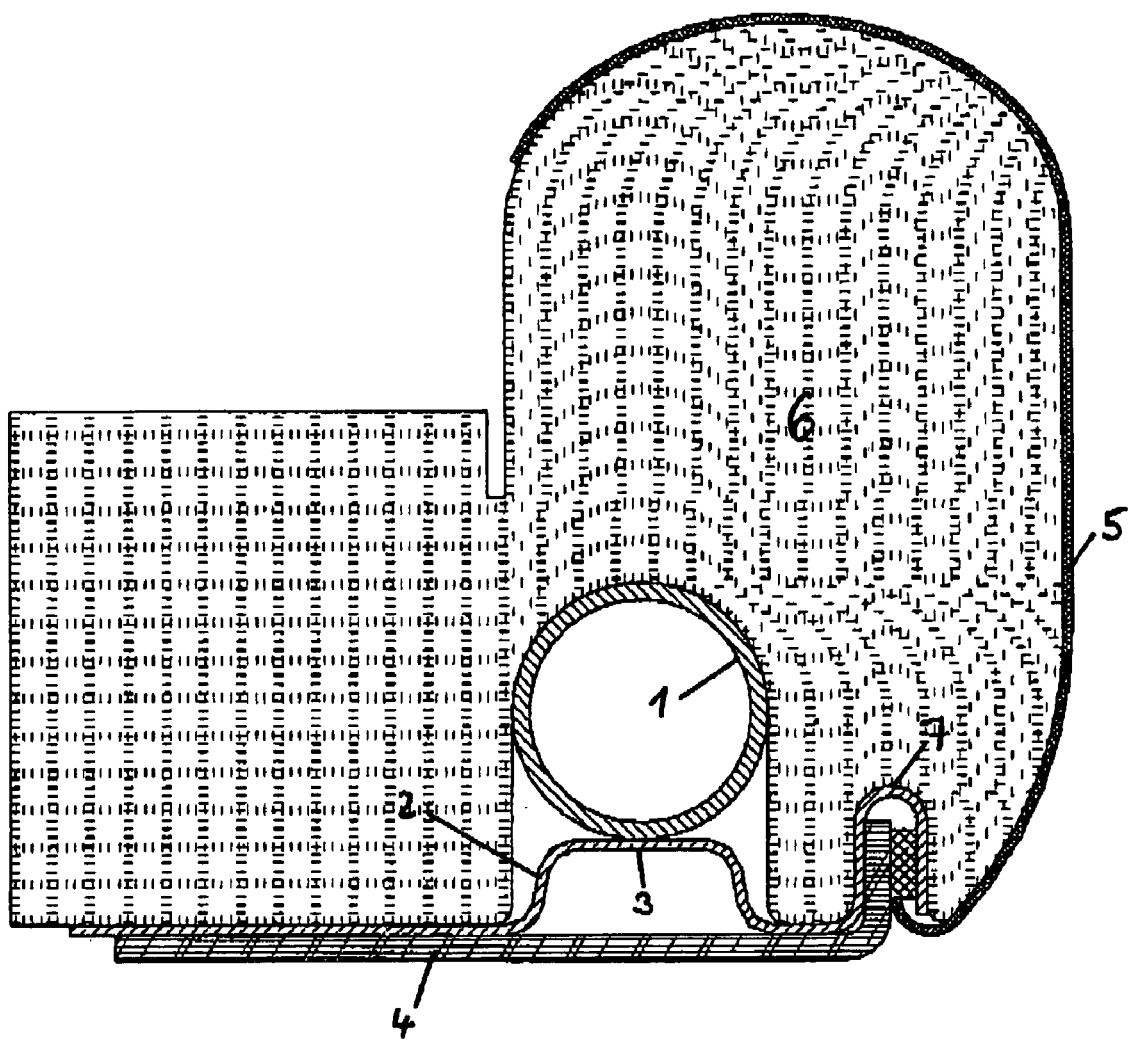
FIG. 1 is a sectional view through a rear seat back frame having a conventional structure.

As shown in FIG. 1, a conventional rear seat back for a vehicle rear seat has a steel tube support frame 1, a rear wall 2 welded thereto at 3 and a covering channel 7 for anchoring the seat covering 5 and/or the carpet 4. A foam cushion 6 is located between the covering 5 and the rear wall 2.

Figure 2:
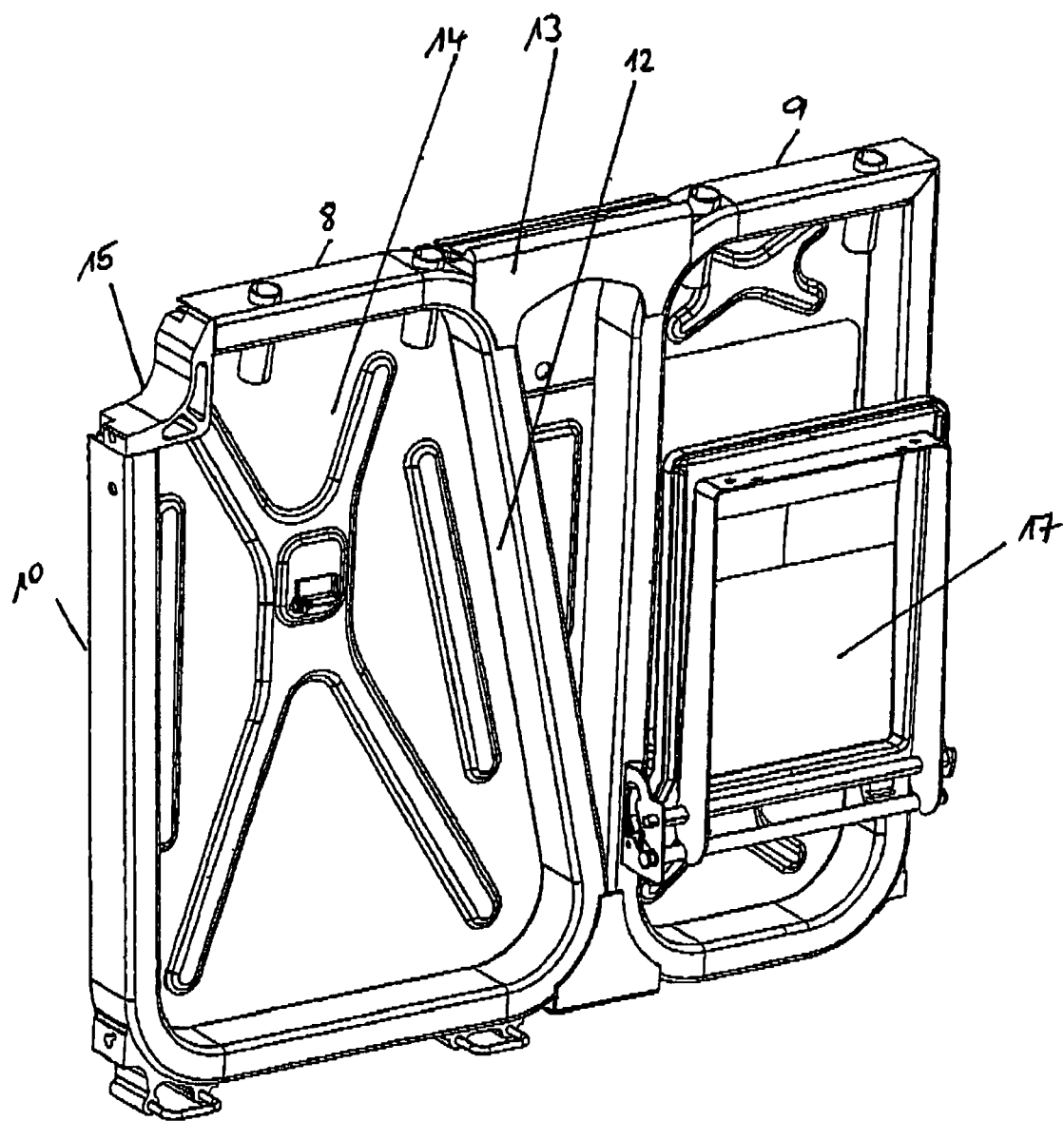
FIG. 2 is a perspective front view of a first embodiment of the rear seat back according to the invention.
Figure 3:
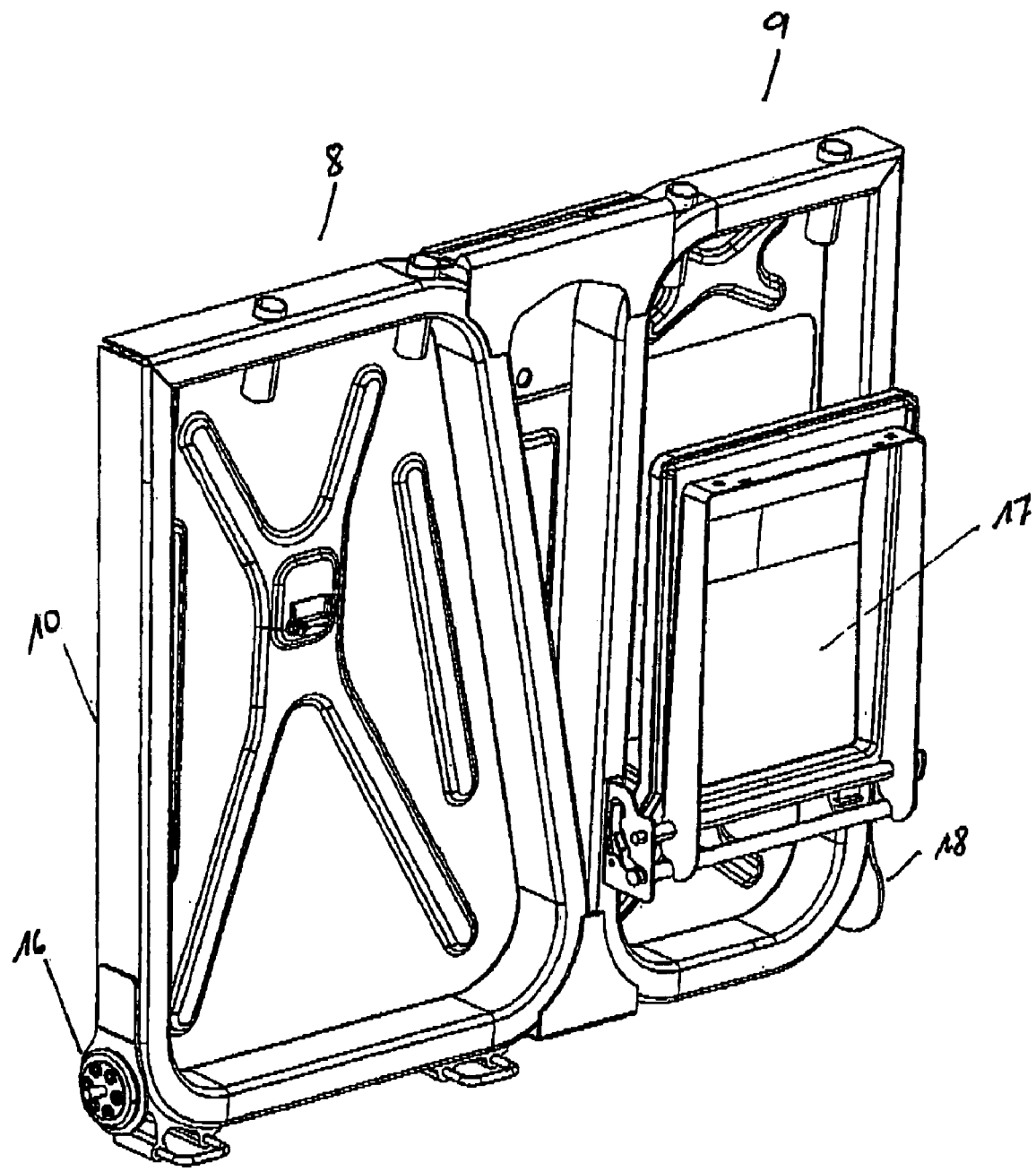
FIG. 3 is a perspective front view of a second embodiment of the rear seat back according to the invention.

FIGS. 2 and 3 show the ⅔ part of a rear seat back according to the invention with a ⅔-⅓ division. This rear seat back section comprises a rear seat back section 8 for the outer seat (in this case driver's side) and a rear seat back section 9 for the middle seat on which a ski bag and arm rest structure 17 made of plastic parts is located.

The rear seat back sections 8, 9 have a rear wall 14 which is stuck, riveted or screwed to the support frame 10 made of extruded profile sections.

As is furthermore shown in FIGS. 2 and 3, the extruded profile section 12 of the support frame 10 runs obliquely inward from top to bottom on the dividing side between the outer seat and the middle seat so that this extruded profile section 12 forms a V-shape together with the adjacent extruded profile section of the support frame of the middle seat. A receiver 13 for the seat-belt winder of the seat belt for the middle seat is arranged between the free ends of the sides of this V-shape.

In the exemplary embodiment shown in FIG. 2, a receiver for the seat back lock on the C pillar is provided at the top of the support frame 10.

In the exemplary embodiment shown in FIG. 3, on the other hand, there are provided an outer support bearing 16 and an inner support bearing 18 by which means the rear seat back is attached rotatably and foldably.

Figure 4:
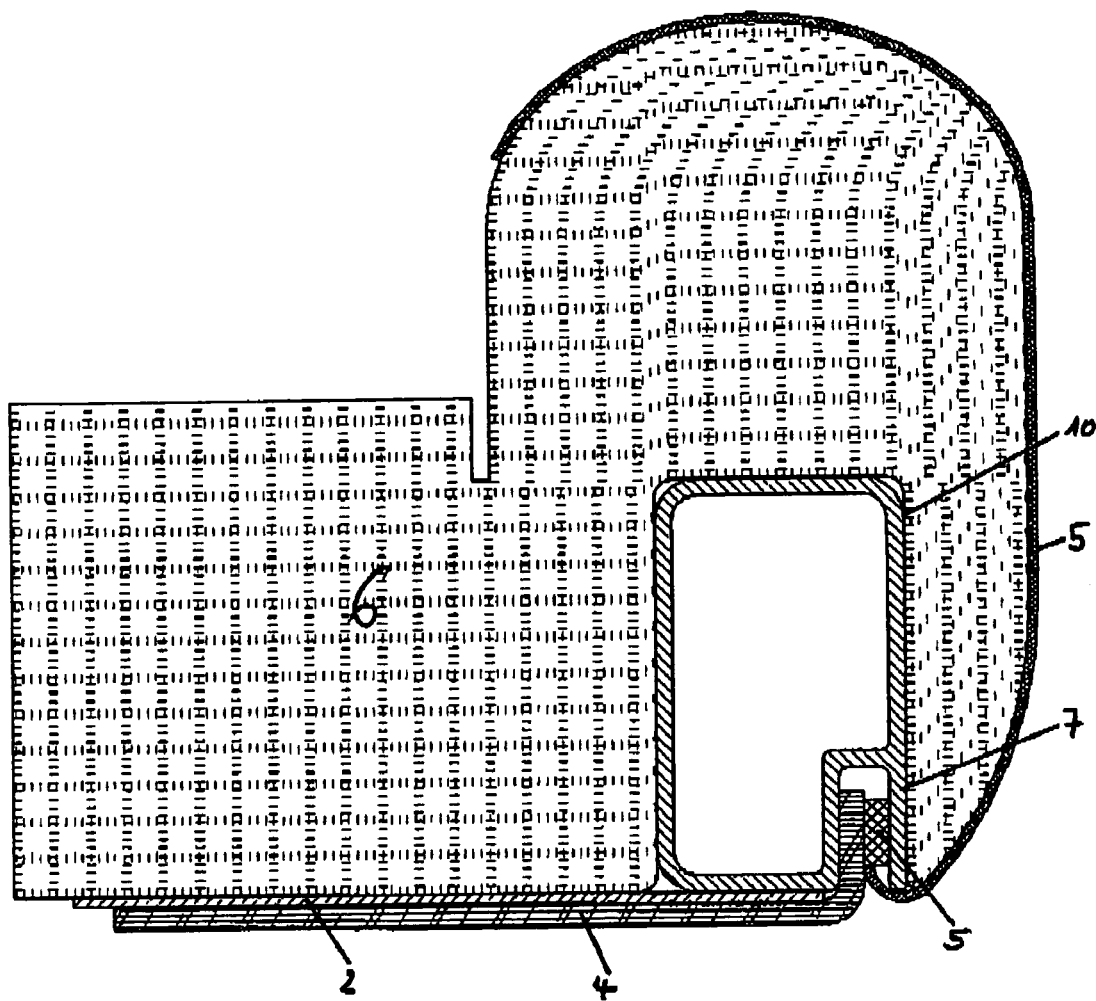
FIG. 4 is a sectional view corresponding to FIG. 1 of an embodiment of the rear seat back according to the invention.

As shown in detail in FIG. 4, the covering channel 7 is integrated in the support frame 10, i.e., is constructed in one piece therewith. This has the result that the rear wall 2 is a flat component without deformations which must be formed by deep drawing by means of suitable deep-drawing tools.

From this it follows that the upper rear seat back structure can be adapted without any problems to different vehicle models without incurring additional tool costs since the rear wall 2, which is a substantially flat component, can easily be adapted in its dimensions by varying the trimming. All of the other components of the rear seat back structure can easily be adapted to any type of vehicle, which particularly applies to the support frame whose horizontal frame sides can easily be lengthened or shortened.

The support frame is especially made of a light metal or a light metal alloy, for example, of aluminium, magnesium or a magnesium or aluminium alloy. The rear wall 2 can be made of aluminium, magnesium, steel or a plastic.

The rear seat back according to the invention having the structure described above has the further advantage that only homologation tests are required for adaptation to a newer vehicle, but there is no need for expensive development work which was required for the conventional rear seat back structures made of steel tubular frames.

What is claimed is:

1. A rear seat back for a vehicle back seat, comprising:
    a support frame,
    a rear wall attached to the support frame, and
    a covering channel for anchoring a seat covering
    wherein the support frame comprises extruded profile sections and is constructed in one piece with the covering channel, and wherein the rear wall is a substantially flat component; wherein the seat back is formed of a ⅔ rear seat back section and a ⅓ rear seat back section, an outer seat support frame section of the ⅔ rear seat back section, in a area dividing an outer seat portion from a middle seat portion, is bounded by an extruded profile section which extends obliquely inwards toward the middle seat portion in a direction from top to bottom and which forms a V-shape with an adjacent extruded profile section of the middle seat portion of the support frame, and wherein a receiver for a seat belt winder for the middle seat is arranged between free ends of sides of the V-shape.

2. The rear seat back according to claim 1, wherein the support frame is made of extruded profile sections of a light metal or a light metal alloy.

3. The rear seat back according to claim 2, wherein said light metal or light metal alloy is aluminium or an aluminium alloy.

4. The rear seat back according to claim 1, wherein the rear wall is adhered to the support frame.

5. The rear seat back according to claim 1, wherein the rear wall is attached to the support frame by rivets.

6. The rear seat back according to claim 1, wherein the rear wall is attached to the support frame by screws.

7. The rear seat back according to claim 1, wherein the support frame is made of extruded profile sections of a light metal or a light metal alloy.

8. The rear seat back according to claim 7, wherein said light metal or light metal alloy is aluminium or an aluminium alloy.

* * * * *